(12) United States Patent  
Hasegawa et al.

(10) Patent No.: US 8,036,505 B2  
(45) Date of Patent: Oct. 11, 2011

(54) ATHERMAL AWG MODULE

(75) Inventors: Junichi Hasegawa, Tokyo (JP); Kazutaka Nara, Tokyo (JP)

(73) Assignee: Furukawa Electric Co., Ltd., Tokyo (JP)

( * ) Notice: Subject to any disclaimer, the term of this patent is extended or adjusted under 35 U.S.C. 154(b) by 30 days.

(21) Appl. No.: 12/646,237

(22) Filed: Dec. 23, 2009

(65) Prior Publication Data

US 2010/0278483 A1     Nov. 4, 2010

(30) Foreign Application Priority Data

Dec. 25, 2008     (JP) .................................. 2008-331428

(51) Int. Cl.
*G02B 6/12* (2006.01)
*G02B 6/34* (2006.01)

(52) U.S. Cl. ................ 385/37; 385/14; 385/50; 385/92; 385/93; 385/94

(58) Field of Classification Search ......................... None
See application file for complete search history.

(56) References Cited

U.S. PATENT DOCUMENTS

2011/0085761 A1     4/2011     Nara et al.

FOREIGN PATENT DOCUMENTS

JP     2006-284632     10/2006

*Primary Examiner* — Charlie Peng
*Assistant Examiner* — Mary A. El-Shammaa
(74) *Attorney, Agent, or Firm* — Oblon, Spivak, McClelland, Maier & Neustadt, L.L.P.

(57) ABSTRACT

An athermal AWG module 10 comprises: an AWG 11 having waveguides partially divided to separate a chip, separated chips being connected by a compensation plate 33 to achieve temperature-independence; an athermal AWG chip 12 having a substrate and the AWG 11 formed on the substrate; a package 13 having an opening 14 and accommodating the athermal AWG chip 12; and a cover for blocking the opening 14. The athermal AWG chip 12 is fully covered with a gelled refractive index matching agent 16 that is matched in refractive index to the waveguides of the AWG 11. As the gelled refractive index matching agent 16 is excellent in water resistance and hardly passes water, the adhesive agent for fixing the compensation plate 33 to the surfaces of the separated two chips is prevented from being deteriorated due to ingress of water, thereby enhancing the reliability.

6 Claims, 5 Drawing Sheets

ATHERMAL AWG MODULE

BACKGROUND OF THE INVENTION

1. Technical Field

The present invention relates to an athermal AWG module used as an optical multiplexer/demultiplexer, for example, in wavelength division multiplexing optical communications, which module is unaffected by the temperature, that is, athermal.

2. Related Arts

In an arrayed waveguide grating (AWG)-type optical multiplexer/demultiplexer that handles the function of an optical multiplexer/demultiplexer, the center wavelength (transmission center wavelength) is dependent on the temperature due to temperature dependence of the refractive index of the silica glass. In order to cancel its temperature dependence, Japanese Patent Laid-open Publication No. 2006-284632 discloses an AWG-type optical multiplexer/demultiplexer in which waveguides are partially cut to separate a chip and separated chips are connected with a compensation plate to achieve athermalization (temperature-independence).

By the way, in the case of manufacturing an athermal AWG module by accommodating the conventional AWG chip as disclosed in the above-mentioned JP 2006-284632 into a package, there is a problem that an adhesive agent for fixing the compensation plate to the separated chips is deteriorated by penetration of water and the center wavelength fluctuates. Further, as the waveguides are cut partially, there is a need to fill matching oil that is matched in refractive index to the waveguides, and any contrivance needs to be made for the package to prevent leakage of the oil. In order to solve these problems, there is contemplated an athermal AWG module that adopts a hermetic structure in which a cover for blocking an opening of the package is secured to the package by welding. The inner structure of this athermal AWG module is illustrated in FIG. 10 and the module in which the cover is closed for blocking the opening is illustrated in FIG. 11. This athermal AWG module 100 has an athermal AWG chip 120 as disclosed in the above-mentioned JP 2006-284632, a package 130 for accommodating the chip and a cover 150 blocking an opening 140 of the package 130. In the athermal AWG chip 120, an AWG 110 having partially cut waveguides is formed on a substrate. This athermal AWG chip 120 is divided into two by a crossing separation surface 300 and a noncrossing separation surface 310 and the separated chips are connected with the compensation plate 330. Then, in this athermal AWG module 100, matching oil is injected through an oil inlet (not shown) into the package 130 hermetically sealed by welding.

However, in this athermal AWG module 100, there are problems of high cost and larger module size for required welding margin. In other words, as there is local temperature increase in the welded part 160 during welding and the temperature of the chip also increases, there is a need to provide a predetermined distance A between the welded part 160 and the athermal AWG chip 120. This results in the problems that the module size becomes larger. Besides, as the welding operation has to be done, the cost becomes higher.

The present invention has been made in view of the conventional problems, and it is an object of the present invention to provide an athermal AWG module that is low in cost and small sized and has high reliability.

BRIEF SUMMARY OF THE INVENTION

In order to solve the above-mentioned problems, an athermal AWG module according to a first aspect of the present invention comprises: an athermal AWG chip having AWG waveguides formed thereon, the athermal AWG chip being partially divided and separated chips being connected with a compensation plate to achieve temperature-independence; a package having an opening and provided for accommodating the athermal AWG chip; a cover for blocking the opening; and a gelled refractive index matching agent that is matched in refractive index to the waveguides and filled at least between the separated chips.

According to this structure, as the gelled refractive index matching agent matched in refractive index to the waveguides is filled at least in between the separated chips of the athermal AWG chip, there is no need to adopt the hermetic structure for fixing the cover to the package by welding, thereby achieving cost reduction and downsizing. Therefore, the athermal AWG module can be realized to be small-sized, low in cost and of higher reliability. Further, as both of the separated chips are shifted following the movement of the compensation plate in a state where the gelled refractive index marching agent is filled in between the chips, the lost can be reduced.

In an athermal AWG module according to another aspect of the present invention, the gelled refractive index matching agent covers at least a whole of the athermal AWG chip.

According to this structure, the whole of the athermal AWG chip is covered with the gelled refractive index marching agent that is matched in refractive index to the waveguides. The gelled refractive index marching agent is excellent in water resistance and hard to pass water therethrough. This prevents the adhesive agent for fixing the compensation plate to the surfaces of the separated chips from being deteriorated due to ingress of water and further prevents the center wavelength from fluctuating due to deterioration of the adhesive agent. This leads to enhancement of the reliability. Further, the gelled refractive index marching agent has higher viscosity than the liquid (matching oil) and is used to cover the whole of the athermal AWG chip. With this structure, there is no need to adopt the hermetic structure for fixing the cover to the package by welding, thereby achieving cost reduction and downsizing. Therefore, the athermal AWG module can be realized to be small-sized, low in cost and of higher reliability. Further, as the whole of the athermal AWG chip is covered with the gelled refractive index matching agent, damage to the athermal AWG chip 12 during thumps, bumps and vibration can be reduced and a strong or firmly-constructed athermal AWG module can be provided.

In an athermal AWG module according to another aspect of the present invention, the athermal AWG chip has at least one light input waveguide, a first slab waveguide connected to an output end of the light input waveguide, a plurality of arrayed waveguides which are connected to an output end of the first slab waveguide and are different in length from each other, a second slab waveguide connected to output ends of the arrayed waveguides, and a plurality of light output waveguides connected to an output end of the second slab waveguide, at least one of the first slab waveguide and the second slab waveguide is separated by a crossing separation surface that crosses a path of light crossing the slab waveguide thereby to separate the AWG chip into a plurality of waveguide chips, and the waveguide chips are connected by the compensation plate.

In an athermal AWG module according to another aspect of the present invention, the athermal AWG chip is divided into two waveguide chips by separating a first slab waveguide or a second slab waveguide by a crossing separation surface that crosses a path of light propagating in the slab waveguide and the two waveguide chips are connected by the compensation plate.

In an athermal AWG module according to another aspect of the present invention, the cover is secured to the package with a screw to block the opening and no hermetic structure is provided between the cover and the package. According to this structure, the cost can be reduced further.

In an athermal AWG module according to another aspect of the present invention, the gelled refractive index matching agent is filled in a whole inside of the package in which the athermal AWG chip is accommodated. According to this structure, the reliability can be enhanced further.

According to the present invention, the gelled refractive index matching agent matched in refractive index to the waveguides is filled at least in between the separated chips of the athermal AWG chip and therefore, the athermal AWG module can be provided to be small-sized, low in cost and of higher reliability.

BRIEF DESCRIPTION OF THE DRAWINGS

The above and other objects and features of the invention will appear more fully hereinafter from a consideration of the following description taken into connection with the accompanying drawing wherein one example is illustrated by way of example, in which.

DETAILED DESCRIPTION OF THE INVENTION

Figure 1:
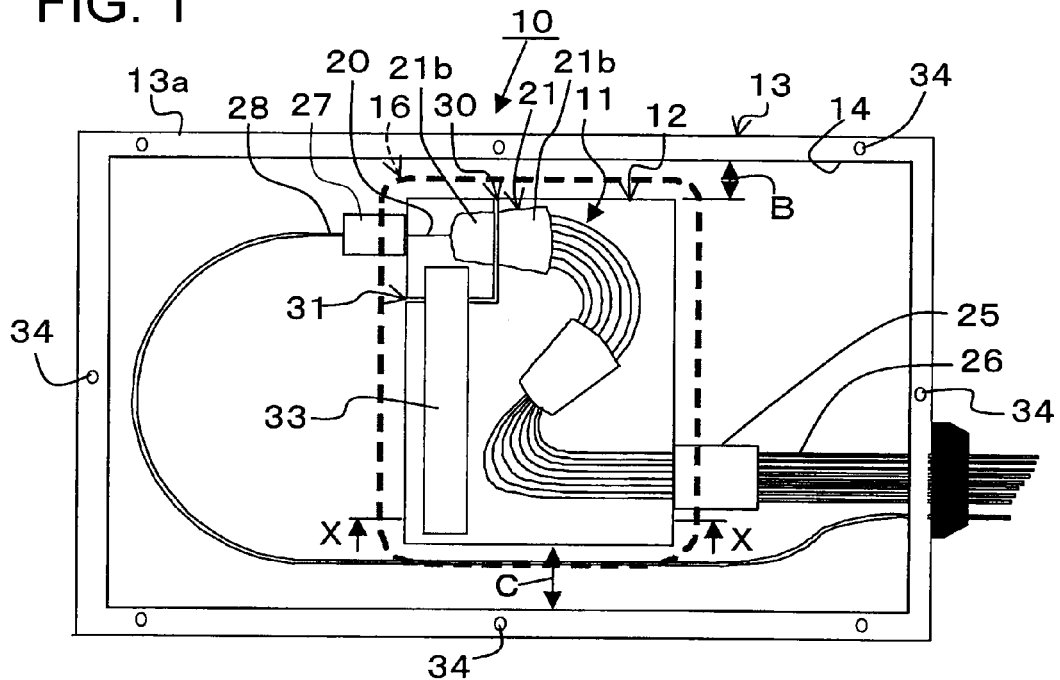
FIG. 1 is a plan view illustrating an inner structure of an athermal AWG module according to a first embodiment.

With reference to the drawings, embodiments of the present invention will be described below. Here, the same parts in each embodiment are denoted by the same reference numerals and double explanation is omitted here.

First Embodiment

Figure 2:
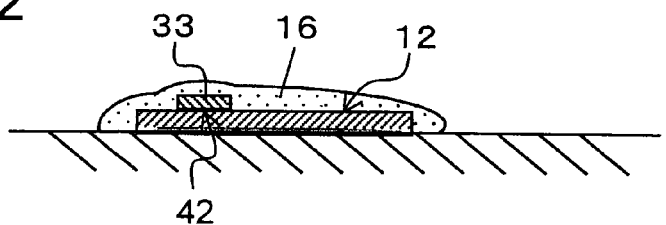
FIG. 2 is a cross sectional view taken along the line X-X of FIG. 1.

FIG. 1 illustrates an inner structure of an athermal AWG module 10 according to a first embodiment of the present invention. This athermal AWG module 10 has an athermal AWG chip 12 on which waveguides of an AWG 11 are formed, the chip being separated partially and separated chips being connected by a compensation plate 33 thereby to achieve temperature-independence. The athermal AWG module 10 also has a package 13 having an opening 14 and for accommodating the athermal AWG chip 12 and a cover 15 (FIG. 3) for blocking the opening 14. Besides, in the athermal AWG module 10, as illustrated in FIGS. 1 and 2, the whole of the athermal AWG chip 12 is covered with a gelled refractive index matching agent 16 that is matched in refractive index to the waveguides of the AWG 11.

The athermal AWG chip shown in FIG. 1 will be described further in detail, with reference to FIG. 4 This athermal AWG chip 12 is a chip on which waveguides of silica glass are formed on a substrate of silicon or the like. The AWG 11 of the athermal AWG chip 12 has one or more light input waveguides 20, a first slab waveguide 21 connected to output ends of the light input waveguides 20, an arrayed waveguide 22 connected to the output end of the first slab waveguide 21, a second slab waveguide 23 connected to the output end of the arrayed waveguide 22 and a plurality of light output waveguides 24 connected to output end of the second slab waveguide 23.

The arrayed waveguide 22 is configured to propagate light from the first slab waveguide 21 and has a plurality of channel waveguides 22a arranged in parallel with each other. The lengths of adjacent channel waveguides 22a differ from each other by a set value ($\Delta L$). The light output waveguides 24 are provided to be equal in number to light signals of mutually different wavelengths that are multiplexed/demultiplexed by the AWG 11, for example. In FIG. 4, the respective numbers of the channel waveguides 22a, the light output waveguides 24 and the light input waveguide 20 are simplified for simple illustration.

For example, a transmission-side optical fiber (not shown) is connected to the light input waveguide 20, which receives wavelength division multiplexed light. This wavelength division multiplexed light passes through the light input waveguide 20, is input to the first slab waveguide 21, spread due to the diffraction effect therein, and input to the arrayed waveguide 22 to propagate in the arrayed waveguide 22. After propagating in the arrayed waveguide 22, the light reaches the second slab waveguide 23 and then, is focused on the light output waveguides 24 to be output. Here, as all of the channel waveguides 22a of the arrayed waveguide 22 are different in length from each other, the phases of light signals after passing through the respective channel waveguides 22a are shifted from each other. In accordance with this phase shift, the wavefront of focused lights are tilted, and according to this tilt angle, the focusing positions are determined.

For this reason, the focusing positions of the light signals of different wavelengths become different from each other and the light output waveguides 24 are formed at the respective positions thereby to output light beams of different wavelengths via the respective light output waveguides 24. In other words, the AWG 11 has such a light demultiplexing function that wavelength division multiplexed light of mutually different wavelengths input from the light input waveguide 20 is demultiplexed into one or more light signals of different wavelengths, which are output from the respective light output waveguides 24.

With the above-described function, the AWG 11 can be used as an optical transmission device for light multiplexing/demultiplexing applied to wavelength division multiplexing transmission. For example, when a wavelength division multiplexed light of wavelengths $\lambda 1, \lambda 2, \lambda 3, \ldots, \lambda n$ (n is an integer of 2 or more) is input via one light input waveguide 20, the lights of the respective wavelengths are spread in the first slab waveguide 21, reach the arrayed waveguide 22, pass through the second slab waveguide 23, are focused on positions that differ according to the wavelength, are input to mutually different light output waveguides 24, pass through the respective light output waveguides 24 and are output from output ends of the light output waveguides 24.

Each optical fiber 26 (see FIG. 1) of an optical fiber array 25 for light output is connected to the output end of each light output waveguide 24, thereby light of each wavelength is extracted via each optical fiber 26. Besides, an optical fiber 28 (see FIG. 1) of an optical fiber array 27 for light input is connected to the input end of the light input waveguide 20, thereby the light is input via the optical fiber 28.

Further, as the AWG 11 makes use of the principle of reciprocity (reversibility) of the optical circuit, it serves as both of light demultiplexer and multiplexer. That is, contrary to the above case, when a plurality of light signals of mutually different wavelengths are input via respective light output waveguides 24, these light signals pass through the reverse propagation path to the above, are multiplexed by the arrayed waveguide 22 and the first slab waveguide 21, and are output via one light input waveguide 20.

When the athermal AWG chip 12 having above-described functions is manufactured, first, the Flame Hydrolysis Deposition (FHD) method is used, by which a lower-part clad layer and a core layer are formed on the silicon substrate in this order. Then, photolithography and reactive ion etching are used to transfer waveguide pattern of the AWG 11 to the core layer. After that, the FHD method is used again to form an upper-part clad layer.

Figure 4:
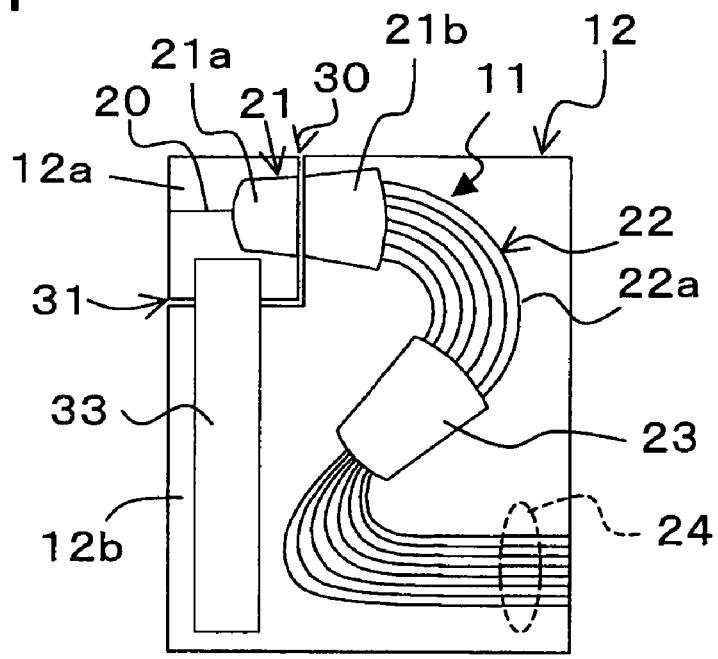
FIG. 4 is a plan view illustrating an athermal AWG chip.

In the athermal AWG chip 12 illustrated in FIG. 4, the first slab waveguide 21 is divided by a crossing separation surface 30 that crosses the path of light propagating in the first slab waveguide 21. The crossing separation surface 30 is provided extending from one end (upper end side in FIG. 4) of the athermal AWG chip 12 to a midpoint of the athermal AWG chip 12. This crossing separation surface 30 is linked to a non-crossing separation surface 31 which is formed not to cross the first slab waveguide 21.

Figure 5:
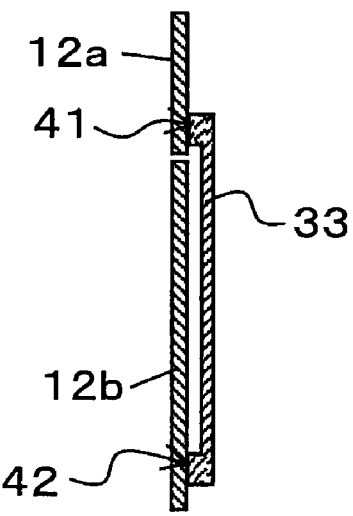
FIG. 5 is a side view of the athermal AWG chip of FIG. 4.

In addition, the athermal AWG chip 12 is divided into two, that is, a first waveguide chip 12a including one separated slab waveguide 21a and a second waveguide chip 12b including the other separated slab waveguide 21b by the crossing separation surface 30 and the non-crossing separation surface 31. There is provided a compensation plate 33 that straddle both of the first waveguide chip 12a and the second waveguide chip 12b. This compensation plate 33 is fixed to the surfaces of the first waveguide chip 12a and the second waveguide chip 12b at the adhesion parts 41 and 42, respectively, illustrated in FIG. 5, by an adhesive agent. This compensation plate 33 is made of, for example, aluminum alloy 1080 (the alloy number of Japanese Industrial Standards (JIS)).

This athermal AWG chip 12 is configured to slide the first waveguide chip 12a relative to the second waveguide chip 12b along the crossing separation surface 30, by the compensation plate 33, depending on the temperature. In other words, when the temperature changes, the focusing position by the first slab waveguide 21 also changes, and then the first waveguide chip 12a can be slid relative to the second waveguide chip 12b up to the changed focusing position by the expansion and contraction of the compensation plate 33. Therefore, even if the temperature changes, the same light input waveguide 20 or the same light output waveguides 24 can be used to extract the light of the same wavelength. This is the principle of the athermal AWG 11 which achieved the temperature-independence.

Figure 3:
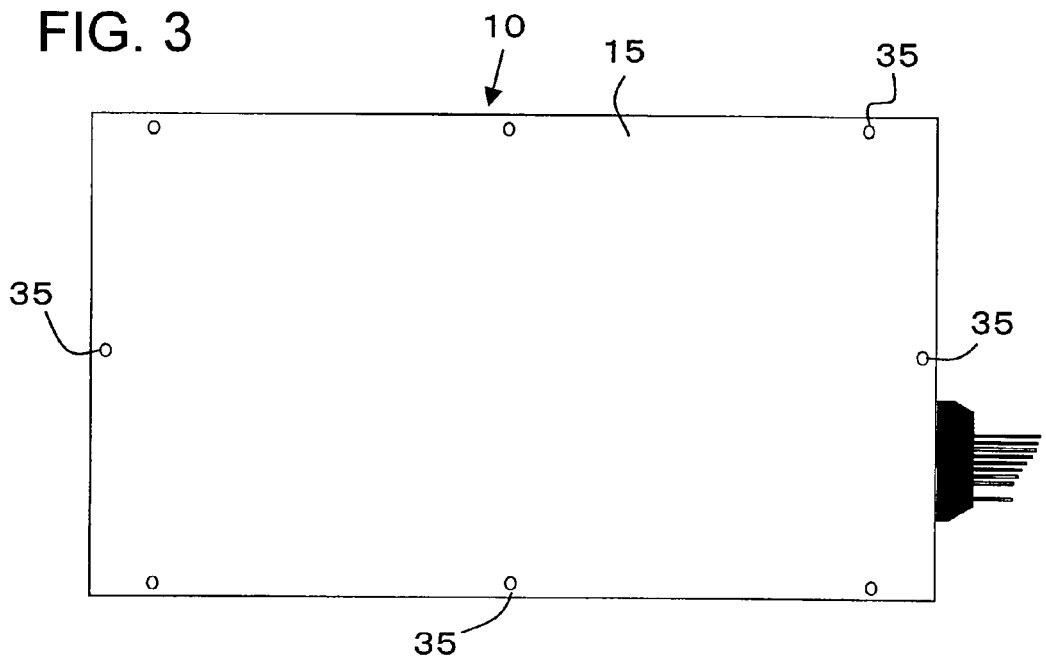
FIG. 3 is a plan view illustrating appearance of the athermal AWG module according to the first embodiment.

Further, in the athermal AWG module 10, as illustrated in FIG. 3, the cover 15 is fixed to the package 13 with screws (not shown) and the hermetic structure is not adopted. As illustrated in FIG. 1, there is a plurality of screw holes 34 in a peripheral wall part 13a of the package 13. Meanwhile, as illustrated in FIG. 3, there is a plurality of through holes 35 for passage of screws in the cover 15. The screws are made to pass through the respective through holes 35 and engaged with the screw holes 34 of the package 13 for screwing firmly thereby to fix the cover 15 to the package 13.

EXAMPLES

First, a 100 GHz-48 ch athermal AWG chip 12 was manufactured on a silicon substrate by using the FHD method, photolithography and reactive ion etching.

Then, at one slab waveguide (first slab waveguide 21), the athermal AWG chip 12 was separated into two and the separated chips were connected by the compensation plate 33 of pure aluminum (JIS: A1050).

Later, the athermal AWG chip 12 was accommodated in the package 13, a gelled refractive index matching agent (silicone-type thermosetting gel) 16 that is matched in refractive index to the waveguides was used to cover the whole of the athermal AWG chip 12, the agent was hardened into a gel, and then, the cover 15 was secured to the package 13 with screws. At this time, as the gelled refractive index matching agent 16 is filled in the separated part of the first slab waveguide 21, there is almost no diffraction loss in the separated part. Besides, the cover 15 is secured to the package 13 only with screws to block the opening 14 and no hermetic structure is adopted between the cover 15 and the package 13.

Further, as illustrated in FIG. 2, the adhesive agent at the adhesion parts 41 (see FIGS. 5) and 42 between the athermal AWG chip 12 and the compensation plate 33 is fully covered with the gelled refractive index matching agent 16. Likewise, the adhesion part 41 (see FIG. 5) between the athermal AWG chip 12 and the compensation plate 33 is fully covered with the gelled refractive index matching agent 16. The gelled refractive index matching agent has almost the same optical characteristic and temperature characteristic as the conventional matching oil and exhibits excellent characteristics.

Figure 6:
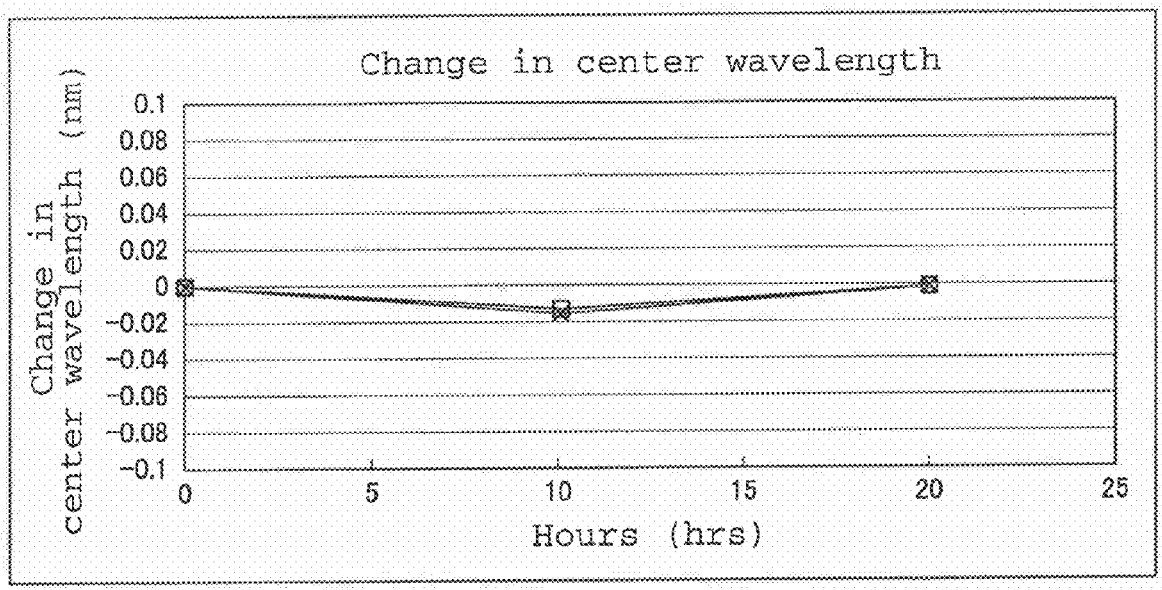
FIG. 6 is a graph illustrating results of a pressure cooker test and illustrating change in center wavelength.
Figure 7:
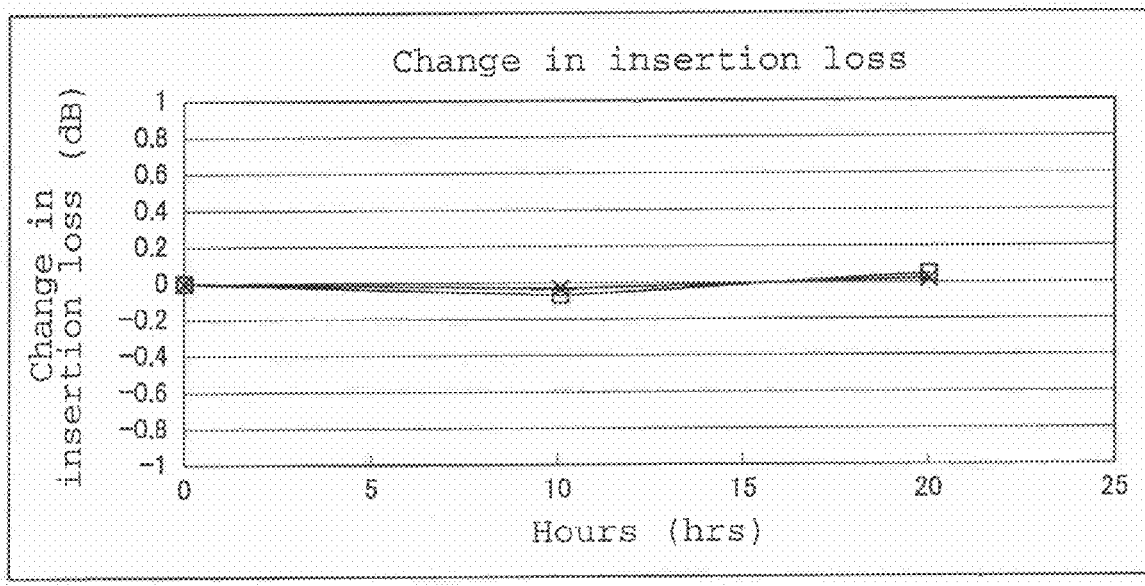
FIG. 7 is a graph illustrating a graph illustrating results of the pressure cooker test and illustrating change in insertion loss.

FIGS. 6 and 7 illustrate results of a pressure cooker test (120° C., 100%, 2 atmospheric pressure) of the athermal AWG module 10. Under extremely severe conditions, there was almost no change of the center wavelength and the insertion loss even in 20 hours as illustrated in FIGS. 6 and 7. These results are almost equivalent to those of the conventional athermal AWG module having the hermetic structure and have proved high reliability of this athermal AWG module 10. Besides, the module size is 95×60×8.5 mm and it was able to be made smaller than the conventional size (130×65×8.5 mm).

Further, there was no fear of oil leakage due to pressure change between before and after the test, and the athermal AWG module 10 was able to achieve higher reliability.

Furthermore, as the whole of the athermal AWG chip 12 is covered with the gelled refractive index matching agent 16, damage to the athermal AWG chip 12 during impact and vibration can be reduced and a strong athermal AWG module 10 can be obtained.

The first embodiment having the above-described structure exerts the following effects:

The whole of the athermal AWG chip 12 is covered with the gelled refractive index matching agent 16 (for example, silicone-type thermosetting gel) that is matched in refractive index to the waveguides. As the gelled refractive index matching agent 16 is excellent in water resistance and hardly passes water, the adhesive agent for fixing the compensation plate 33 to the surfaces of the separated two chips (the first waveguide chip 12a and the second waveguide chip 12b) is prevented from being deteriorated due to ingress of water, which further prevents fluctuation of center wavelength due to deterioration of the adhesive agent. Therefore, the athermal AWG module 10 can achieve improved reliability.

If the matching oil that is matched in refractive index to the waveguides is filled like in the conventional art, there has been a need to adopt the hermetic structure for fixing the cover for blocking the opening of the package to the package by welding in order to prevent leakage of the oil. Meanwhile, in the present embodiment, the whole of the athermal AWG chip 12 is covered with the gelled refractive index matching agent 16 that is matched in refractive index to the waveguides and exhibits higher viscosity than the liquid (matching oil). Therefore, there is no need to adopt the hermetic structure for fixing the cover 15 to the package 13 by welding and the cost reduction and downsizing can be achieved. Downsizing becomes possible by the following reasons.

Figure 10:
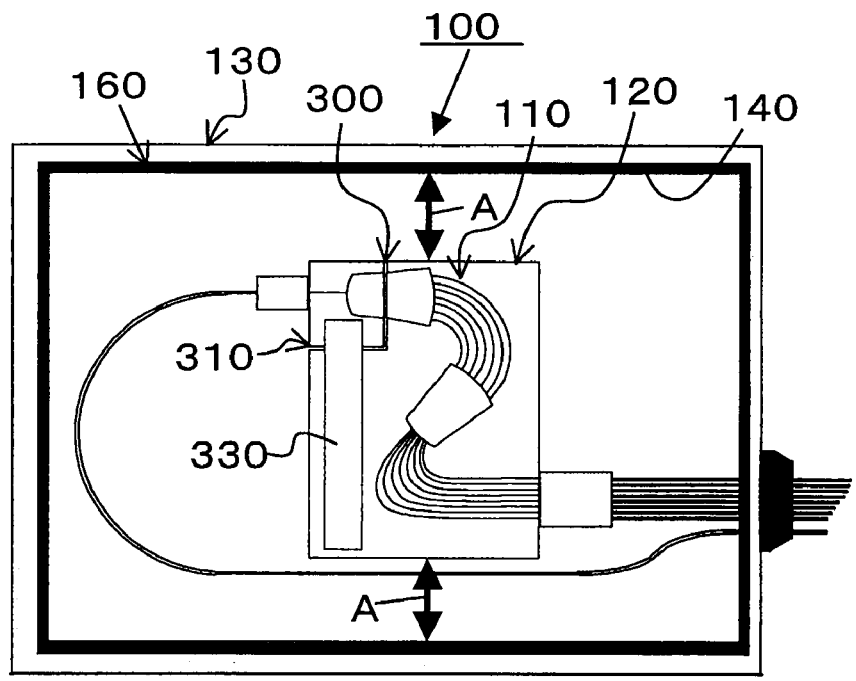
FIG. 10 is a plan view an illustrating inner structure of a conventional athermal AWG module.
Figure 11:
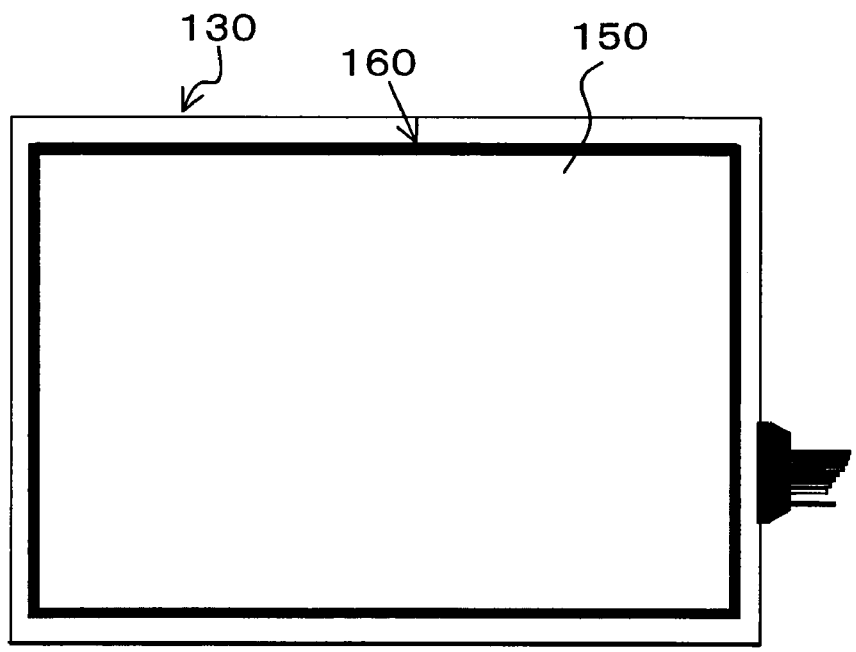
FIG. 11 is a plan view illustrating appearance of the athermal AWG module of FIG. 10.

In the above described conventional art, there is a need to provide the predetermined distance A as a welding margin between the welded part 160 and the athermal AWG chip 120 (see FIG. 10). On the contrary, in the present embodiment, as the welding is not used, the edge of the package 13 can be moved closer to the edge of the athermal AWG chip 12 and the distances B and C illustrated in FIG. 1 can be made smaller than the predetermined distance A.

Therefore, it becomes possible to realize a small-sized, low-cost and highly reliable athermal AWG module 10.

Further, in case that the AWG module is used in the open air in the WDM-PON system that realizes both of a broadcasting service and point-to-point transmission simultaneously, even if the ambient temperature changing for example in the range from −40° C. to 85° C. is required, the athermal AWG module can be realized satisfying this temperature requirement and suitable to use in the open air.

Second Embodiment

Figure 8:
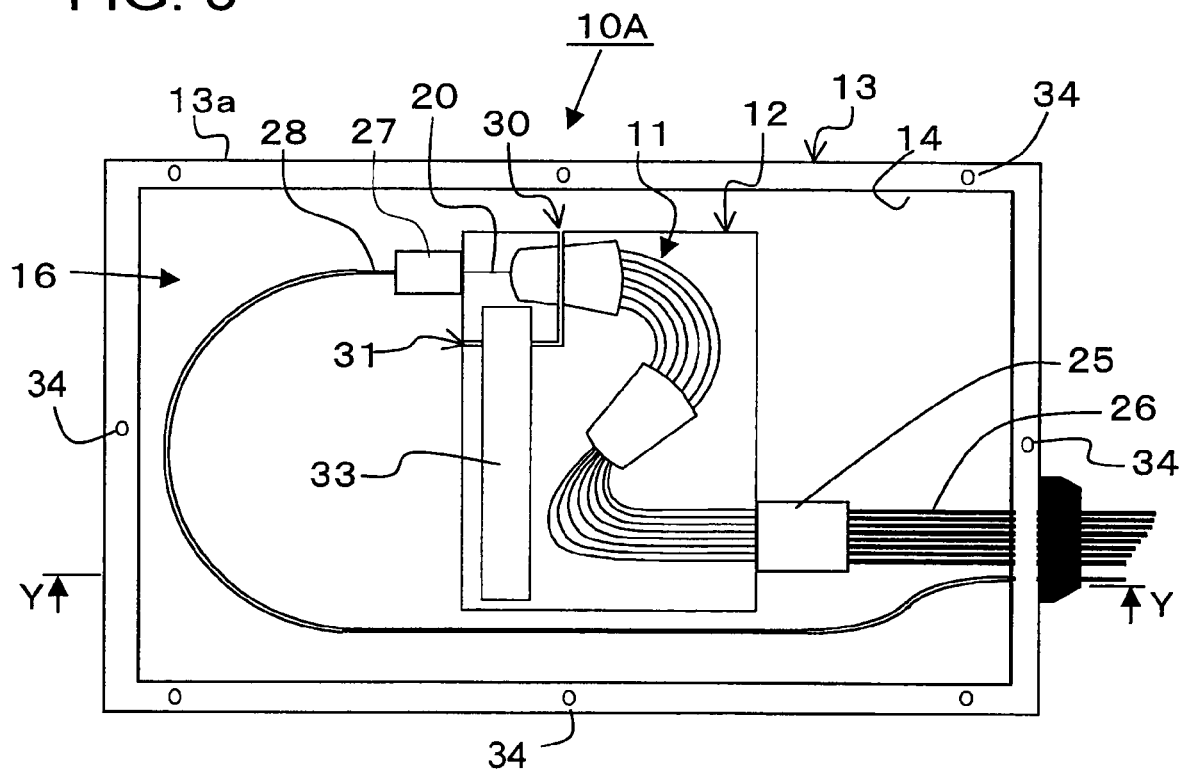
FIG. 8 is a plan view illustrating an inner structure of an athermal AWG module according to a second embodiment.
Figure 9:
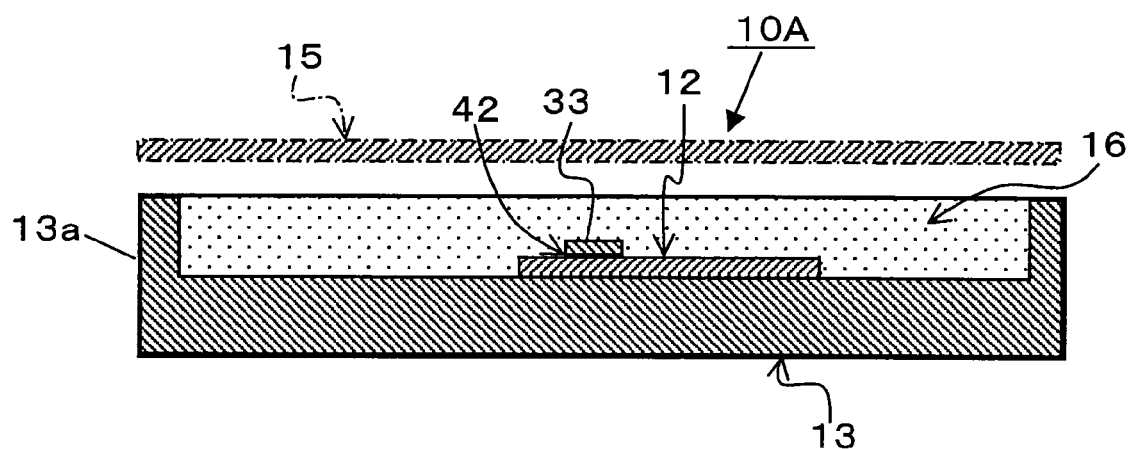
FIG. 9 is a cross sectional view taken along the line Y-Y of FIG. 8.

FIG. 8 illustrates an inner structure of an athermal AWG module 10A according to a second embodiment of the present invention. In this athermal AWG module 10A, a gelled refractive index matching agent 16 is filled fully inside the package 13. The other structure is same as the first embodiment. According to this second embodiment, as the gelled refractive index matching agent 16 is filled in a whole inside of the package 13, the reliability of the athermal AWG module 10A is further enhanced.

In the above-mentioned first embodiment, the athermal AWG chip 12 is fully covered with the refractive index matching agent 16 that is matched in refractive index to the waveguides of AWG 11, however, this is not for limiting the present invention. In the athermal AWG chip 12 illustrated in FIG. 4, the first slab waveguide 21 is divided into two chips (first waveguide chip 12*a* and the second waveguide chip 12*b*) by the crossing separation surface 30 that crosses the path of light propagating in the first slab waveguide 21. The present invention is also applicable to an athermal AWG module having gelled refractive index matching agent filled in between these separated two chips 12*a* and 12*b*.

The present invention is not limited to the above described embodiments and various and modifications may be possible without departing from the scope of the present invention.

What is claimed is:

1. An athermal AWG module comprising:
an athermal AWG chip having waveguides of AWG formed thereon, the athermal AWG chip being partially divided and separated chips being connected by a compensation plate to achieve temperature-independence;
a package having an opening and provided for accommodating the athermal AWG chip;
a cover for blocking the opening; and
a gelled refractive index matching agent that is matched in refractive index to the waveguides and being filled at least between the separated chips.

2. The athermal AWG module of claim 1, wherein the gelled refractive index matching agent covers at least a whole of the athermal AWG chip.

3. The athermal AWG module of claim 1 or 2, wherein the athermal AWG chip has at least one light input waveguide, a first slab waveguide connected to an output end of the light input waveguide, a plurality of arrayed waveguides which are connected to an output end of the first slab waveguide and are different in length from each other, a second slab waveguide connected to output ends of the arrayed waveguides, and a plurality of light output waveguides connected to an output end of the second slab waveguide,
at least one of the first slab waveguide and the second slab waveguide is separated by a crossing separation surface that crosses a path of light crossing the slab waveguide thereby to separate the AWG chip into a plurality of waveguide chips, and
the waveguide chips are connected by the compensation plate.

4. The athermal AWG module of claim 1 or 2, wherein the athermal AWG chip is divided into two waveguide chips by separating a first slab waveguide or a second slab waveguide by a crossing separation surface that crosses a path of light propagating in the slab waveguide and the two waveguide chips are connected by the compensation plate.

5. The athermal AWG module of claim 1 or 2, wherein the cover is secured to the package with a screw to block the opening and no hermetic structure is provided between the cover and the package.

6. The athermal AWG module of claim 1 or 2, wherein the gelled refractive index matching agent is filled in a whole inside of the package in which the athermal AWG chip is accommodated.

* * * * *